(12) United States Patent
Crane

(10) Patent No.: US 11,176,122 B2
(45) Date of Patent: Nov. 16, 2021

(54) SYSTEMS, METHODS AND ARCHITECTURE FOR UPDATING PARAMETERS IN MAINFRAME RELATIONAL DATABASES

(71) Applicant: Bank of America Corporation, Charlotte, NC (US)

(72) Inventor: Tyler H. Crane, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 197 days.

(21) Appl. No.: 16/744,339

(22) Filed: Jan. 16, 2020

(65) Prior Publication Data

US 2020/0151168 A1   May 14, 2020

Related U.S. Application Data

(63) Continuation of application No. 15/807,908, filed on Nov. 9, 2017, now Pat. No. 10,572,472.

(51) Int. Cl.
| | |
|---|---|
| *G06F 16/00* | (2019.01) |
| *G06F 16/23* | (2019.01) |
| *G06F 21/32* | (2013.01) |
| *G06F 21/62* | (2013.01) |
| G06F 3/0484 | (2013.01) |
| G06F 3/0482 | (2013.01) |

(52) U.S. Cl.
CPC ...... *G06F 16/2379* (2019.01); *G06F 16/2358* (2019.01); *G06F 16/2365* (2019.01); *G06F 21/32* (2013.01); *G06F 21/6227* (2013.01); *G06F 3/0482* (2013.01); *G06F 3/04847* (2013.01)

(58) Field of Classification Search
CPC .. G06F 16/2379; G06F 16/2358; G06F 21/32; G06F 3/04847; G06F 3/0482; G06F 16/2386
See application file for complete search history.

(56) References Cited

U.S. PATENT DOCUMENTS

| | | | |
|---|---|---|---|
| 5,430,871 | A | 7/1995 | Jamoussi et al. |
| 5,870,725 | A | 2/1999 | Bellinger et al. |
| 6,064,821 | A | 5/2000 | Shough et al. |
| 6,243,703 | B1 | 6/2001 | Couch et al. |
| 6,289,368 | B1 | 9/2001 | Dentler et al. |

(Continued)

OTHER PUBLICATIONS

Willie Favero, "The Good, the Bad and the Really Ugly: DB2's DSNZPARM Module," http://enterprisesystemsmedia.com/article/the-good-the-bad-and-the-really-ugly-db2s-dsnzparm-modulel#sr=d&m=n&cp=d&ct=-tmc&ts=1526488807, Apr. 1, 2005.
"Pattern Matching," https://en.wikipedia.org/wiki/Pattern_matching, Retrieved on Oct. 25, 2017.

(Continued)

*Primary Examiner* — Leslie Wong
(74) *Attorney, Agent, or Firm* — Weiss & Arons LLP; Michael A. Springs, Esq.

(57) ABSTRACT

Systems, architecture and methods for updating parameters in relational database management software of a mainframe computing system is provided. Methods and apparatus are provided for streamlining the updating of the parameters. Methods and apparatus for reducing errors in the updating of the parameters are also provided, as well as for reducing risk of malicious corruption of data stored in an enterprise database. Also provided are methods and apparatus for detecting and/or tracking database parameter updates and/or errors.

21 Claims, 6 Drawing Sheets

(56) References Cited

U.S. PATENT DOCUMENTS

| | | | |
|---|---|---|---|
| 7,225,249 | B1 | 5/2007 | Barry et al. |
| 7,234,118 | B1 | 6/2007 | Bleizeffer et al. |
| 7,376,603 | B1 | 5/2008 | Mayr et al. |
| 7,941,438 | B2 | 5/2011 | Molina-Moreno et al. |
| 8,117,500 | B2 | 2/2012 | Ng |
| 8,464,246 | B2 | 6/2013 | Davies et al. |
| 8,510,707 | B1 | 8/2013 | Heuler |
| 9,218,401 | B2 | 12/2015 | Dee et al. |
| 9,679,059 | B2 | 6/2017 | Dee et al. |
| 10,025,801 | B2 | 7/2018 | Kaufman et al. |
| 2002/0016771 | A1 | 2/2002 | Carothers et al. |
| 2006/0230319 | A1 | 10/2006 | Ryali et al. |
| 2008/0177804 | A1 | 7/2008 | Meinsen |
| 2009/0099982 | A1 | 4/2009 | Heuler et al. |
| 2012/0054095 | A1 | 3/2012 | Lesandro et al. |
| 2013/0211866 | A1 | 8/2013 | Gordon et al. |
| 2015/0095289 | A1 | 4/2015 | Prabhu et al. |
| 2016/0210195 | A1 | 7/2016 | Sinha |
| 2016/0275150 | A1 | 9/2016 | Bournonnais et al. |
| 2016/0292206 | A1 | 10/2016 | Ruiz Velazquez et al. |
| 2016/0342655 | A1 | 11/2016 | Mishra et al. |

OTHER PUBLICATIONS

Willie Favero, "First Look at the DB2 10 Changes to DSNZPARMs," IBM Corporation, Retrieved on Oct. 27, 2017.

Craig Mullins, DSNZPARMs: DB2 System Configuration Parameters IBM DB2 Community, https://community.toadworld.com/platforms/ibmdb2/b/weblog/archive/2013/12/18/dsnzparms-db2-system-configuration-parameters, Toad World, Dec. 18, 2013.

"Subsystem Parameters," https://www.ibm.com/support/knowledgecenter/en/SSEPEK_11.0.0/intro/src/tpc/db2z_zparm.html, Retrieved on Sep. 25, 2017.

"Pattern Recognition," https://en.wikwedia.org/wiki/Pattern_recognition, Retrieved on Oct. 25, 2017.

"Post Quantum Cryptography," https://pqcrypto.org/, Retrieved on Oct. 20, 2017.

"Post Quantum Cryptography," https://en.wikipedia.org/wiki/Post-quantum_cryptography, Retrieved on Oct. 20, 2017.

"Relational Database Management Systems," https://en.wikipedia.org/wiki/Relational_database_management_system, Retrieved on Sep. 25, 2017.

"Software Architecture," https://en.wikipedia.org/wiki/Software_architecture, Retrieved on Oct. 26, 2017.

"Where (SQL)," https://en.wikipedia.org/wiki/Where_(SQL), Retrieved on Oct. 25, 2017.

"Wildcard Character," https://en.wikipedia.org/wiki/Wildcard_character, Retrieved on Oct. 25, 2017.

```
9S02 ------------- SUSBSYSTEM MENU SELECTION PANEL ----------- Row 1 of 16
COMMAND ===> -                                   SCROLL===> PAGE
SELECT THE TARGET SUBSYSTEM(S) YOU WISH TO MAKE ZPARM CHANGES TO.
TYPE AN "S" TO CHOOSE THE TARGET SUBSYSTEM(S) THEN PRESS "ENTER" TO CONT.
CHECK CURRENT ZPARM VARIABLE? ---- ( 'Y' -YES  'N' -NO )

SELECT  TARGET      LAST CHANGE MADE
        SUBSYS      ON EACH SUBSYSTEM
 ----    A11B       17/11/19   ABCDEFG    ABCDEFGHIJK=A12B1
 ----    A12B       17/10/14   ABCDEFG    ABCDEFGHIJK=A12B1
 ----    A13B       17/09/04   DEFGHLN    ABCDEFGHIJK=A12B1
 ----    A14B       17/09/04   ABCOHLN    ABCDEFGHIJK=A12B1
 ----    A15B       17/09/04   DEFOHLN    ABCDEFGHIJK=B21C2
 ----    A16B       17/08/28   GHKSEFG    ABCDEFGHIJK=B21C2
 ----    A17B       17/09/04   ABCDEFG    ABCDEFGHIJK=A12B1
 ----    A18B       17/09/04   ABCDEFG    ABCDEFGHIJK=B21C2
 ----    A19B       17/09/04   DEFDEFG    ABCDEFGHIJK=B21C2
 ----    A1AB       17/08/28   DEFABCD    ABCDEFGHIJK=A12B1
 ----    A1BB       17/09/04   GHJABCD    ABCDEFGHIJK=B21C2
 ----    A1CB       17/09/04   GHJABCD    ABCDEFGHIJK=B21C2
 ----    A1DB       17/09/04   LNPASDD    ABCDEFGHIJK=A12B1
 ----    A1EB       17/08/28   ABCDEFG    ABCDEFGHIJK=B21C2
 ----    A1FB       17/08/28   GHJABCU    ABCDEFGHIJK=A12B1
 ----    A1GB       17/08/28   LNPABCD    ABCDEFGHIJK=B21C2
*ENVPANE
```

FIG. 2

SYSTEMS, METHODS AND ARCHITECTURE FOR UPDATING PARAMETERS IN MAINFRAME RELATIONAL DATABASES

CROSS REFERENCE TO RELATED APPLICATION

This application is a continuation of U.S. patent application Ser. No. 15/807,908, filed on Nov. 9, 2017, which is hereby incorporated herein by reference in its entirety.

FIELD OF TECHNOLOGY

This disclosure relates to database management. In particular, the disclosure relates to updating parameters in relational databases stored on mainframes.

BACKGROUND

Relational database management systems have been widely used for the past several decades to store information. Information stored may include enterprise data, such as manufacturing information, logistical data, financial records and personnel data. Typical systems include IBM DB2™, ORACLE™, MySQL™, MICROSOFT SQLServer™, PostgreSQL™, MICROSOFT ACCESS™ and SQLite™. With the advent of the "Age of Big Data", these systems continue to be invaluable as enterprise tools. However, as datasets continue to grow exponentially, conventional procedures for implementing these and other systems have become prohibitively clumsy, time-consuming and error-prone. Updating databases and their constituent subsystems, for example, carry an ever-increasing risk of intentional and unintentional corruption of database entries.

During conventional parameter updating procedures, even when performed by a database programmer, unintentional "fat-fingering" and/or incorrect insertions of updates and changes may result in corruption of the datasets. Undetected, these errors can be devastating for enterprises and individuals who rely on the accuracy of the data.

According to conventional methods of database management, there is limited ability to detect, trace or track these types of errors. Furthermore, with the rising threat of malware and other cyberattacks on business and other enterprises, there is a growing need to secure data-updating processes.

It would be desirable, therefore, to provide methods and apparatus for streamlining updating of parameters in mainframe relational database management software. It would also be desirable to provide methods and apparatus for reducing errors in the updating of the parameters. It would further be desirable to provide methods and apparatus for reducing risk of malicious corruption of data stored in an enterprise database. It would also be desirable to provide methods and apparatus for detecting and/or tracking database parameter updates and/or errors.

BRIEF DESCRIPTION OF THE DRAWINGS

The objects and advantages of the invention will be apparent upon consideration of the following detailed description, taken in conjunction with the accompanying drawings in which:

FIG. 2 shows a presentation of an illustrative interface in accordance with principles of the invention;

DETAILED DESCRIPTION

Figure 1A:
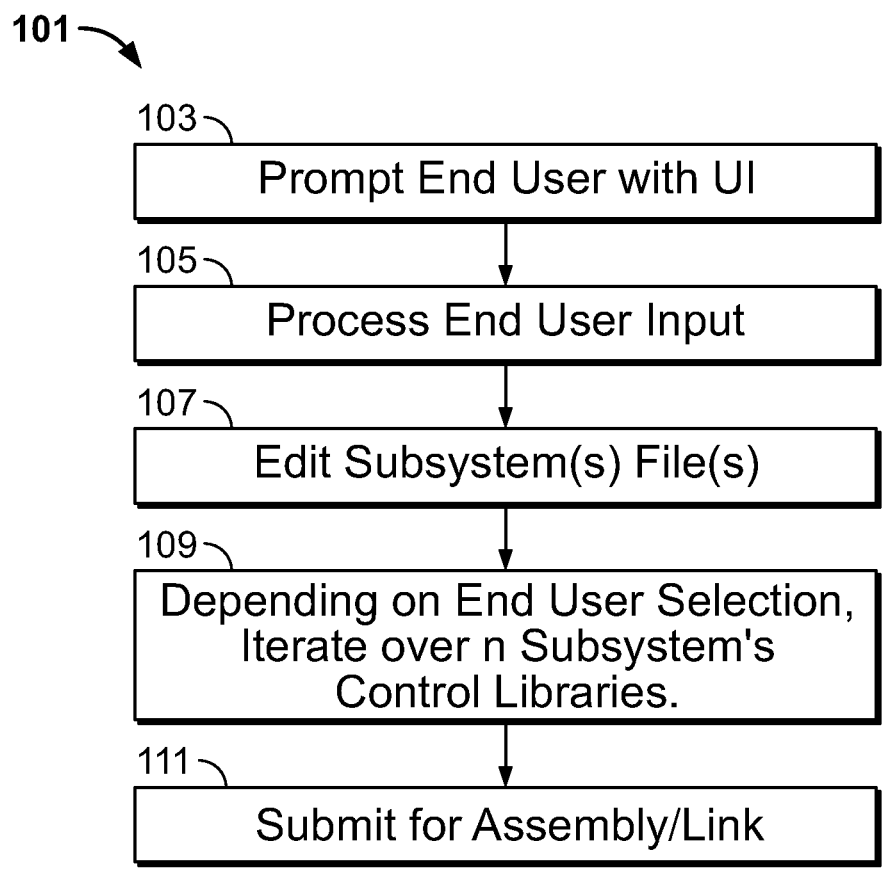
FIG. 1A is an illustrative flow diagram in accordance with principles of the invention.

Apparatus and methods for updating parameters in relational database management software of a mainframe computer are provided.

The apparatus may include, and the methods may involve, a parameter-updating system. The system may be for use in conjunction with mainframe relational database management software, such as IBM DB2™ for z/OS™. The system may include and/or involve a medium comprising a non-transitory machine-readable memory. The system may include and/or involve machine-readable program code. The non-transitory memory may store computer-executable instructions. The code may include the instructions. The instructions may include the software. The software may include the instructions.

The system may include one or more than one processor configured to execute the computer executable instructions. For example, a processor circuit may be embedded in an integrated circuit board associated with and/or included in the system. The processor may control one, some or all operations of the system and/or of associated components of the system.

The system may include RAM, ROM, an input/output ('I/O") module and a non-transitory or non-volatile memory. The I/O module may include a microphone, button and/or touch screen which may accept user provided input. The I/O module may include one or more of a speaker for providing audio output and one or more display for providing textual, audiovisual and/or graphical output.

Computer executable instructions such as software applications may be stored within the non-transitory memory and/or other storage media. The software may provide instructions to the processor that enable the system to perform various functions. For example, the non-transitory memory may store software used by the system, such as an operating system, application programs, web browser and one or more than one database. Alternatively, or additionally, some or all of computer executable instructions of the system may be embodied in hardware and/or firmware components of the system.

Software application programs may include computer executable instructions for invoking user functionality related to communication, such as email, short message service ("SMS"), and voice input and speech recognition applications.

The system may operate in a networked environment. For example, the system may support network connections to other systems within a complex web. The system may support establishing network connections to one or more remote computers. Such remote computers may be nodes on a network. The nodes may be personal computers, mainframes and/or servers that may include many or all of the elements described above as related to the system.

The network connections may include a local area network ("LAN") and a wide area network ("WAN"), and may also include other networks. When used in a LAN networking environment, the system may be connected to the LAN through a network interface or adapter. The communication circuit may include the network interface or adapter.

When used in a WAN networking environment, the system may include a modem or other means for establishing communications over a WAN, such as the Internet. It will be appreciated that the existence of any of various well-known protocols such as TCP/IP, Ethernet, FTP, HTTP and the like is presumed, and the system may be operated in a client-server configuration to permit a user to retrieve web pages from a web-based server. Web browsers may be used to display and manipulate data on web pages associated with the system.

The system may include one or more of various other components, such as a battery, a speaker, and antennas. For example, network nodes may be portable devices such as a laptop, a tablet, chat-bot, a smartphone or any other suitable device for receiving, storing, transmitting and/or displaying relevant information.

The system may be operational with numerous general purpose or special purpose computing system environments or configurations. Examples of well-known computing systems, environments, and/or configurations that may be suitable for use with the invention include, but are not limited to, mainframe computers, personal computers, server computers, hand-held or laptop devices, tablets, mobile phones and/or other personal digital assistants ("PDAs"), multiprocessor systems, microprocessor-based systems, set top boxes, programmable consumer electronics, network PCs, minicomputers, distributed computing environments that include any of the above systems or devices, and the like.

The system may utilize computer-executable instructions, such as program modules, executed by a computer. Generally, program modules include routines, programs, objects, components, data structures, etc. that perform particular tasks or implement use of particular data types. The system may be operational with distributed computing environments where tasks are performed by remote processing devices that are linked through a communications network. In a distributed computing environment, program modules may be located in both local and remote computer storage media including memory storage devices.

A device that accesses the system may include one or more features of the system. For example, an accessing device may be a smart phone, desktop computer or other device. The accessing device may be operated by, for example, an enterprise employee.

The apparatus may include, and the methods may involve, a system architecture. The system architecture may include and/or involve the system. The system architecture may include and/or involve the database. The system may include the database.

The system architecture may be configured for updating one or more subsystem parameters. The subsystem parameters may be associated with one or more subsystems. The subsystems may be included in a relational database management system. The relational database management system may be associated with one or more than one database. The database may be managed by an enterprise. The database may be managed by an employee of the enterprise. The employee may include a programmer.

The system architecture may include and/or involve the display. The display may be configured to present one or more features. The features may include one or more widgets, such as windows and/or buttons. The features may be presented via one or more than one user interface (UI). The UI may include one or more than one graphical user interface (GUI). The features may be presented via a first of the UI.

The features may prompt one or more than one selection of one or more than one of the subsystems. The features may facilitate the selection of the subsystem(s). The selection(s) of the subsystem(s) may facilitate updating of one or more of the subsystem parameters. The subsystem parameter(s) may be associated with the selected subsystem(s).

The system architecture may include one or more than one receiver module. The receiver module may be configured to receive the selection(s).

The system architecture may include one or more than one processor module. The processor may include the processor module. The processor module may be configured to control and/or instruct the display.

The processor module may be configured to instruct the display to present the UI. The processor module may be configured to instruct the display to present a second UI. The second UI may include a second GUI. The second UI may be presented in response to receiving the selection at the receiver module. The second UI may prompt input of the subsystem parameter(s) to be updated. The receiver module may be configured to receive the one or more subsystem parameters to be updated.

The processor module may be configured to perform an execution of one or more than one series of one or more exception handling functions. The processor module may be configured to implement the series of exception handling functions. The processor module may be configured to execute the exception handling functions. The exception handling function(s) may be configured to ensure syntactic compliance of the subsystem parameter(s) to be updated.

The processor module may be configured to perform one or more determination. The determination(s) may be mediated by one or more exception handling functions. The processor module may be configured to execute the exception handling function(s). The determination(s) may determine whether the selection(s) includes more than one subsystem. The determination(s) may determine whether the selection(s) are sequential. The determination(s) may determine whether the selection(s) are individual. The determination(s) may determine whether the selection(s) are offset. The determination(s) may determine whether the selection(s) are individually offset.

The processor module may be configured to perform a storing of the selection(s) in one or more array. The storing of the selection(s) may facilitate later processing.

The processor module may be configured to determine one or more properties of one or more than one parameter variable. The one or more properties may include one or more locations. The location(s) may be in terms of column(s) and/or row(s). The one or more properties may include relation(s) to macro(s). The processor module may be configured to perform a locating of the parameter variable(s). The processor module may be configured to perform a determination of a positioning of the variable in terms of column(s). The processor module may be configured to perform a determination of a positioning of the variable in terms of row(s). The processor module may be configured to perform a determination of a positioning of the variable in terms of relation(s) to a macro(s).

The processor module may be configured to perform one or more than one assignment (hereinafter, in the alternative, "assigning") of one or more than one new value to the subsystem parameter(s). The processor and/or processor module may be configured to implement the assignment.

The assignment may include padding. The assignment may include adding program-specific syntactically-required punctuation.

The processor module may be configured to insert a change log record. The processor module may be configured to generate a change log record. The machine-readable program code may include instructions for generating the change log record. The generation/insertion of the change log record may be dependent upon updating of the parameters. The generation/insertion of the change log record may be dependent upon successful updating of the parameters. The change log record may include one or more indications of the updated parameters. The change log record may facilitate auditing of parameter updates.

The computer-readable program code may be configured such that, upon execution by the processor and when the selection(s) include a plurality of selections, the code may iterate until each of the plurality of selections has been processed. When the selection(s) include a plurality of selections, the computer-readable program code, when executed by the processor, may iterate until each of the plurality of selections has been processed.

The change log record may include one or more than one indicator of a user initiating the updating. The change log record may include one or more than one indicator of the user accessing the database. The change log record may include one or more than one indicator of a property of the updating. The property may include a date. The property may include a time. The property may include a device identifier. The device identifier may correspond to a device from which the updating occurred. The device identifier may correspond to a device from which the database was accessed. The property may include a location of the user at the time of the updating. The property may include a status and/or position of the user within the enterprise owning the database.

The selection(s) of the subsystem(s) may be mediated via a search function. The selection(s) of the subsystem(s) may be mediated via pattern matching. The search function may involve one or more than one pattern. The pattern may include one or more than one sequence. The sequence may include one or more than one token. The pattern may include one or more than one tree. The pattern may include one or more than one string.

The updating of the parameters may involve one or more than one static value. The pattern may include the static value. The token may include the static value. The static value may include one or more than one explicit value. The search function may involve the static value.

The updating of the parameters may involve machine learning. The machine learning may include and/or involve pattern recognition. The selection(s) of the subsystem(s) may be mediated by the pattern recognition. The search function may include and/or involve the pattern recognition.

The search function may include and/or involve one or more than one wildcard search. The wildcard search may include and/or involve one or more than one wildcard character. The search function may include one or more than one "highcard" search. The wildcard search may include the "highcard" search. The highcard search may include searching for an exact match. The highcard search may include the wildcard character.

The search function may include one or more than one "lowcard" search. The wildcard search may include the "lowcard" search. The lowcard search may include searching for one or more than one match less precise than the match searched for by the highcard search. The lowcard search may include the wildcard character. The lowcard search may include one or more than one lowcard range. The range may be set to approximate the match searched for by the highcard search. The wildcard character may include the range. The wildcard character may be in addition to the range. Weights may be assigned to returned value(s) based on a likelihood of relevance, such as determined by closeness of approximation to the match searched for by the highcard search. The weights may be assigned to the returned value(s) based on closeness of approximation to the exact match.

The selection(s) may be mediated via the wildcard search using the wildcard character. The wildcard character may be syntactically specific to the language mediating the search.

The language may include SQL. The language may mediate the updating. The wildcard character may be used in one or more than one LIKE expressions. The wildcard character may include a percent sign ('%') matching zero or more characters. The wildcard character may include an underscore sign ('_') matching a single character. The language may include Transact-SQL. The wildcard character may include square brackets ('[' and ']') matching sets and/or ranges of characters. The brackets may indicate the lowcard range. The wildcard character may include a leading caret ('^') negating the set(s) and/or matching only a character not within the list. Other languages and wildcard characters are also envisioned, such as the asterisk ('*'), question mark ('?'), and/or number sign ('#'), e.g., as used in MICROSOFT™ ACCESS™. The wildcard character may include the Kleene star.

The updating of the parameters may involve one or more than one variable. The pattern may include the variable. The token may include the variable. The search function may include/involve the variable. The updating of the parameters may include and/or involve the user inputting the static value and/or the variable. The variable may include and/or involve the wildcard character.

The computer-readable program code may include instructions for generating one or more than one report. The computer-readable program code may generate the report. The computer-readable program code, when executed by the processor, may generate the report. The computer-readable program code, when executed by the processor, may cause the processor to generate the report. The report may include data associated with the updating. The report may include the change log record. The report may include data from the change log record. The report may include data associated with one or more of the indicators included in the change log record.

The computer-readable program code may include instructions for transmitting the report to an entity. The entity may be responsible for managing the database. The entity may be an associate of the enterprise. The entity may be an employee of the enterprise. The entity may be responsible for auditing the updating of the database.

The methods may include, and the apparatus may involve, a method for updating subsystem parameters. The parameters may be included in one or more than one database management system. The database management system may involve one or more than one relational database. The database may be stored on a computer. The computer may include the mainframe computer. The computer may include the medium comprising the non-transitory machine-readable memory. The method may be performed by the computer-readable program code. The instructions may cause the processor and/or processor module to perform some or all of the method.

The method may include presenting one or more UI. The one or more UI may include the first UI. The one or more UI may include the features facilitating the selection(s) of the subsystem(s) in which to update the parameter(s). The one or more UI may include the features prompting the selection(s) of the subsystem(s). The method may include presenting the features via the one or more UI.

The method may include the presentation of the UI prompting input of the parameter(s) related to the update. The method may include presentation, via the UI, features prompting the input. The presentation of the second UI may be in response to the selection(s). The prompting may be in response to the selection(s).

The method may include the performance of the series of exception handling functions to ensure syntactic compliance of the parameters. The method may include the execution of the series of exception handling functions to ensure syntactic compliance of the parameters.

The method may include the determination of whether the selections include more than one subsystem.

The method may include the determination(s) of whether the selection(s) are sequential, individual, offset and/or individually offset.

The method may include the storage of the selections in the array.

The method may include the locating of the parameter variable. The method may include the determination of the properties of the variable and/or the positioning of the variable in terms of column(s), row(s) and/or relation(s) to macro(s). The locating may include the determination of the positioning of the variable. The locating may include and/or involve a wildcard search function. The locating may be mediated by the wildcard search function. The wildcard search function may include the wildcard search.

The wildcard search function may include one or more high-low card search algorithm. The high-low card search algorithm may include one or more highcard search including a first set of search parameters. The high-low card search algorithm may include one or more lowcard search including a second set of search parameters wider than the first set of search parameters.

The method may include the assignment to the parameters of the new value. The assignment may include the padding of missing digits. The assignment may include the adding of the program-specific syntactically-required punctuation.

The assignment may be dependent upon verification of an identity of the user performing the updating. Implementation of the assigning may be dependent upon the verification. The updating and/or any of constituent steps of the updating may be dependent upon verification of the identity of the user. The verification may include authenticating biometric data. The biometric data may be provided by the user. The verification may involve input of identifying data of the user. The verification may involve input by the user of the identifying data. The identifying data may include the biometric data. The identifying data may include one or more than one passcode. The identifying data may include one or more personal identification number.

The verification may involve a scan of the identifying data, such as a biometric scan for the biometric data. The verification may be performed by a scanner. The scanner may include a barcode scanner. The scanner may include a retinal scanner. The scanner may include a QR™ code scanner. The scanner may include any other suitable scanner or input device for inputting verification data.

The method may include the insertion of the change log record. The insertion of the change log record may be implemented upon the updating of the parameters.

The method may include presentation of a selection feature facilitating searching for the parameter variable to determine if the updating is necessary.

The method may include presentation of one or more than one function facilitating one or more than one option for dynamic reloading of one or more than one subsystem associated with the updating. The function may include one or more selection feature facilitating the dynamic reloading of the subsystem(s). The dynamic reloading of the subsystem(s) may avoid requiring the user to log on manually to logical partition(s) associated with the subsystem.

When the selections include a plurality of selections, the steps of the method may be repeated for each of the selections until some or all of the selections have been processed. The program code when executed by the processor may instruct the processor to perform the repetition of the steps for some or all the selections. The program code may iterate until completion of the steps for some or all the selections.

The method may include the generation of the report. The method may include the transmission of the report. Transmission of the report may be electronically, such as via email or text.

The apparatus may include, and the methods may involve, a database management system for updating subsystem parameters associated with subsystems. The subsystems may be stored on a mainframe computer. The system may include the display. The display may be configured to present the feature(s) on the user interface (UI). The feature(s) may facilitate the selection(s) of the subsystem(s). The selection(s) may be mediated by the wildcard search function. The selections may facilitate the updating of the subsystem parameter(s) associated with the selected subsystem(s).

The system may include the receiver module. The receiver module may be configured to receive the selections. The system may include the processor module. The processor module may be configured to instruct the display of the second UI in response to the selections at the receiver module. The second UI may prompt input of the subsystem parameter(s) to be updated. The receiver module may be configured to receive the subsystem parameter(s) to be updated.

The processor module may be configured to perform a first series of one or more exception handling functions to ensure syntactic compliance of the subsystem parameter(s) to be updated. The processor module may be configured to determine whether the selections include more than one subsystem. The processor module may be configured to determine, using a second series of exception handling function(s), if the selections are sequential, individual, offset and/or individually offset.

The processor module may be configured to perform the locating of the parameter variable(s). The processor module may be configured perform the determination of the positioning of the variable. The processor module may be configured to perform the assignment of the new value to the subsystem parameter(s) to be updated. The assignment may include padding. The assignment may include adding program-specific syntactically-required punctuation. The processor module may be configured to perform the insertion of the change log record including the indications of the updated parameters.

In some embodiments of the invention, the program code may instruct the processor to identify errors associated within the system. The program code may instruct the processor to intervene with quick remediation. The remediation may provide a temporary fix. The remediation may provide a long-term fix. In some embodiments, the system may be configured to make updates and/or changes to any suitable record and/or file within any suitable mainframe environment. The system may be enhanced for multipurpose use. The program code may notify system administrators of trusted and/or suspicious change(s) made. The notification may be via the report.

When the selections include a plurality of selections, the computer-readable program code, when executed by the processor, may iterate until each of the plurality of selections has been processed.

Apparatus and methods described herein are illustrative. Apparatus and methods in accordance with this disclosure will now be described in connection with the figures, which form a part hereof. The figures show illustrative features of apparatus and method steps in accordance with the principles of this disclosure. It is to be understood that other embodiments may be utilized and that structural, functional and procedural modifications may be made without departing from the scope and spirit of the present disclosure.

The steps of methods may be performed in an order other than the order shown and/or described herein. Embodiments may omit steps shown and/or described in connection with illustrative methods. Embodiments may include steps that are neither shown nor described in connection with illustrative methods.

Illustrative method steps may be combined. For example, an illustrative method may include steps shown in connection with another illustrative method.

Apparatus may omit features shown and/or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

FIG. 1A shows illustrative updating process 101 for updating subsystem parameters on a mainframe database. Process 101 may begin at step 103. Process 101 may be performed by a mainframe processor executing machine-readable program code.

At step 103, an end user may be prompted with a user interface (UI), such as a graphic user interface (GUI). The UI may include feature(s) facilitating input selections by the user of subsystem(s), subsystem parameter(s) and/or subsystem parameter load module(s), such as DB2 DSNZPARMs, or ZPARMs, to be searched for and/or updated.

At step 105, the user input may be processed, e.g. by the processor executing the machine-readable program code.

At step 107, one or more subsystem file(s) are edited and/or updated according to the processed user input. Edits and/or updates may be dynamic. One or more keywords on one or more macros may be updated to one or more new values according to the processed user input. For example, one or more ZPARM source may be edited and/or one or more macro keywords may be modified to one or more different values.

At step 109, the processor may repeat sequentially steps 103, 105 and/or 107 for multiple subsystem control libraries selected by the user.

At step 111, the processor may submit parameter update(s) and/or macro(s) for assembly, linking and/or link-editing. The modified source(s) may be assembled. One or more new load modules may be link-edited.

Figure 1B:
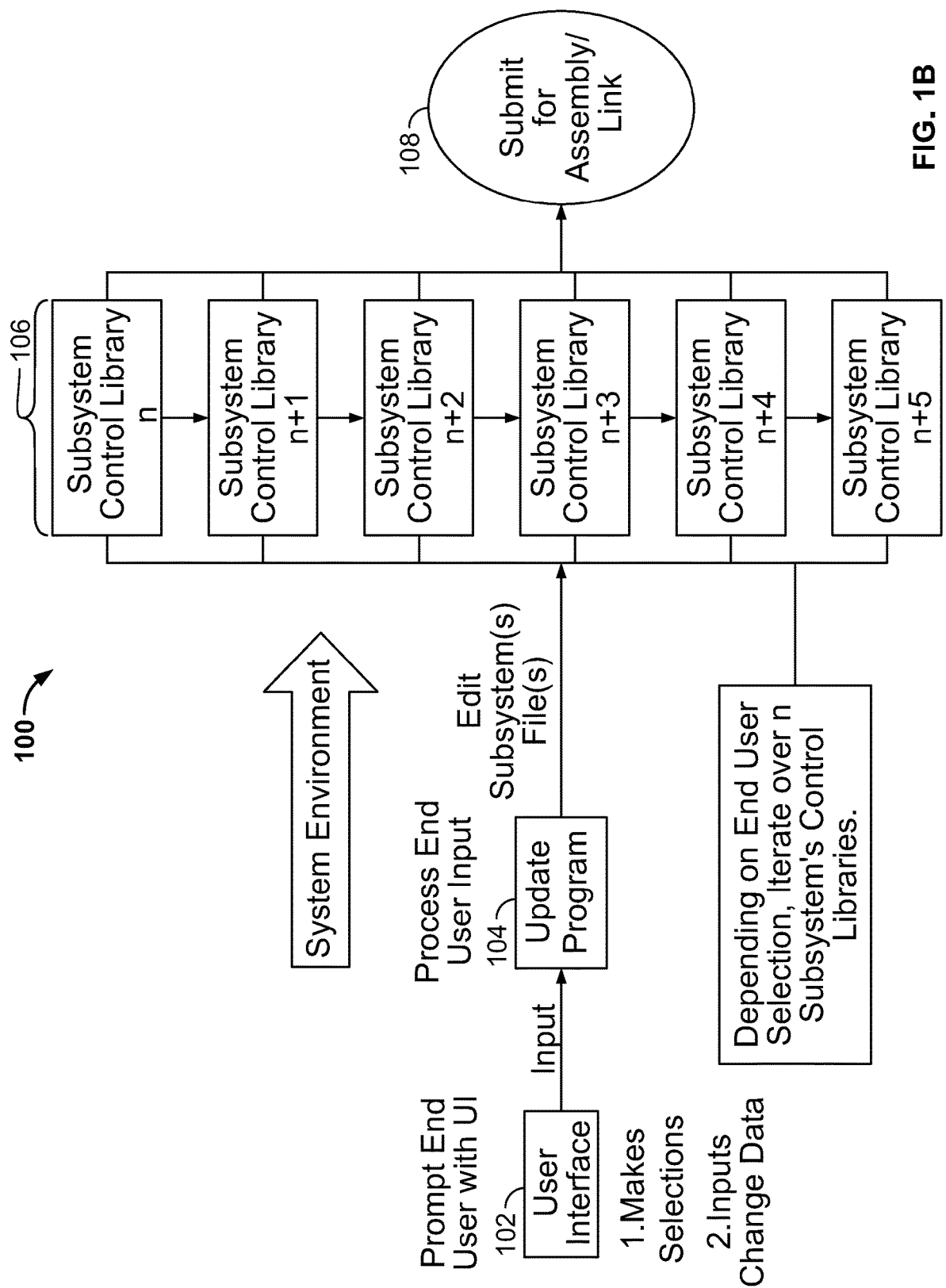
FIG. 1B is an illustrative flow diagram in accordance with principles of the invention.

FIG. 1B shows illustrative system architecture 100 for updating subsystem parameters on a mainframe database. Architecture 100 may include and/or involve user interface (UI) 102. UI 102 may be presented on a display to an end user by a mainframe processor executing machine-readable program code. UI 102 may include a GUI. UI 102 may include feature(s) facilitating input selections by the user of subsystem(s), subsystem parameter(s) and/or subsystem parameter load module(s), such as DB2 DSNZPARMs, or ZPARMs, to be searched for and/or updated.

The user input may be processed by the processor executing machine-readable program 104. Program 104 may edit/update one or more subsystem file(s) according to the user input. Edits and/or updates may be dynamic. One or more keywords on one or more macros may be updated to one or more new values. For example, one or more ZPARM source may be edited and/or one or more macro keywords may be modified to one or more different values. Depending on the end user selection(s), program 104 may instruct the processor to iterate through the edits/updates for each of selected subsystem control libraries 106 of the system environment prior to submission for assembly/linking for DB2 (108).

FIG. 2 shows user illustrative subsystem selection user interface (UI) 200. UI 200 may prompt an end user to select one or more target subsystems for one or more changes and or updates.

UI 200 may be configured to facilitate offset selection(s). UI 200 may be configured to facilitate erasure of mistaken selection(s). UI 200 may be configured to facilitate checking current value(s) assigned to target variable(s) of one or more subsystems. UI 200 may display last change(s) made on the subsystem(s).

UI 200 may include one or more offset-selection features configured to facilitate the offset selection(s). UI 200 may include one or more correction features configured to facilitate the erasure of the mistaken selection(s). UI 200 may include one or more value-checking features configured to facilitate the checking of the current value(s) assigned to the target variable(s). UI 200 may include one or more features for displaying the last change(s) made on the subsystem(s). In some embodiment, feature(s) of UI 200 may include and/or involve one or more widgets mediating function(s) of the feature(s).

UI 200 may include prompt 202 for selecting the subsystems to update. UI 200 may include prompt 204 for checking current subsystem parameter value(s). The current parameter values may include parameter value(s) since a last update. UI 200 may include selection feature(s) 206, 208 and/or 210 facilitating the selection of the subsystem(s) and/or the checking of the current parameter value(s). The erasure of mistaken selection(s) may be mediated, for example, by removing an incorrectly inserted selection ("S") from selection column 208.

UI 200 may include change log 212. Change log 212 may present data associated with the current subsystem parameter values. The data may include the last changes made. The data may include personal identifier(s) of user(s) who executed the change(s). The data may include device identifier(s) of device(s) from which the change(s) were executed. The data may include date(s) and/or time(s) when the change(s) were executed. The data may include location(s) of the change(s). The data may indicate type(s) of the change(s) made.

Figure 3:
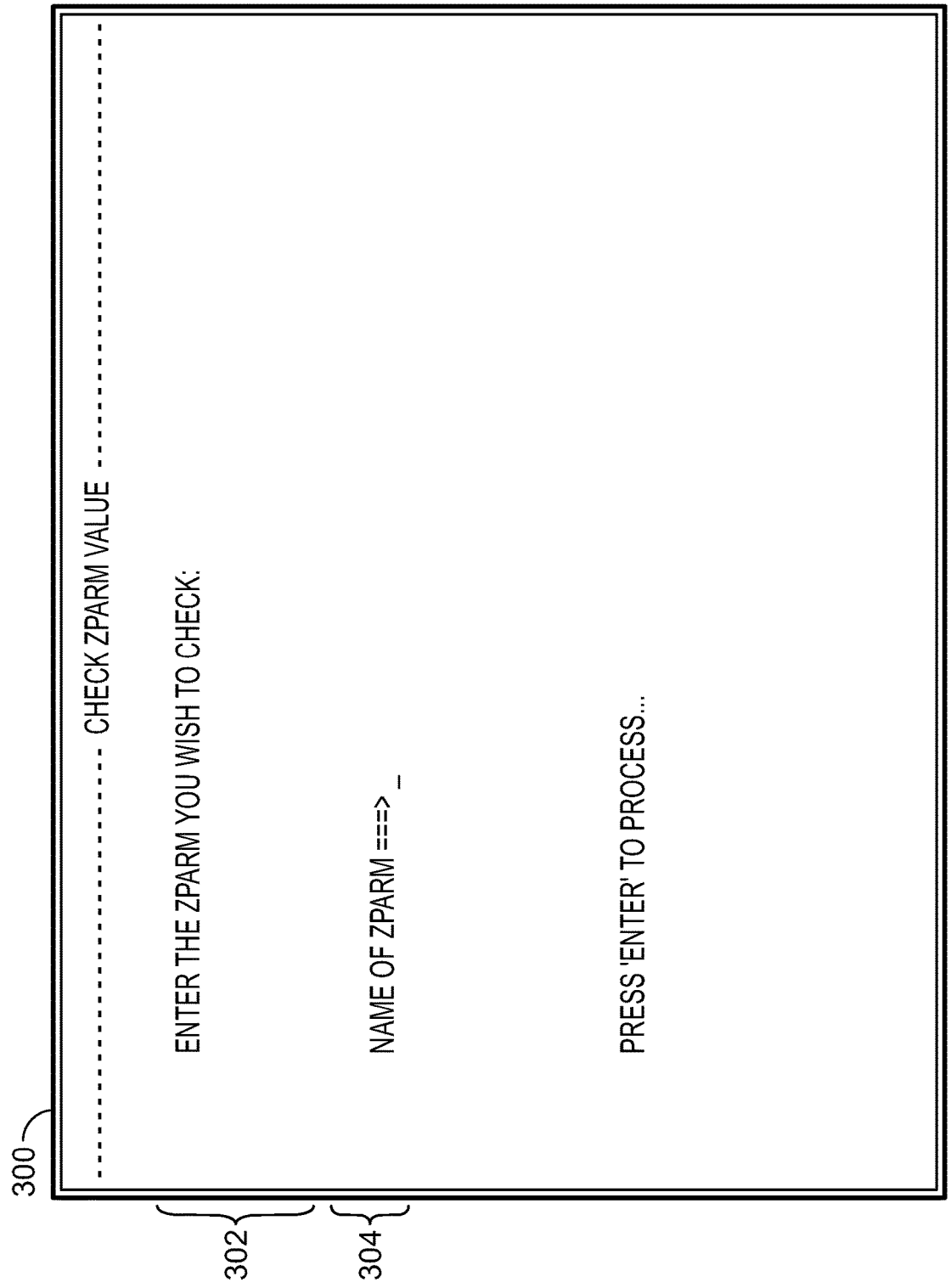
FIG. 3 shows a presentation of an illustrative interface in accordance with principles of the invention.

FIG. 3 shows user illustrative parameter check user interface (UI) 300. UI 300 may be presented to a user upon indication by the user of an intention to check current subsystem parameter value(s), such as via prompt 204 (shown in FIG. 2).

UI 300 may include instructions 302 for inputting parameter(s) and/or variable(s) to check current value(s). UI 300 may include prompt(s) 304 for inputting the parameter(s) and/or variable(s) to check the current value(s). The current parameter values may include parameter value(s) since a last update.

Figure 4:
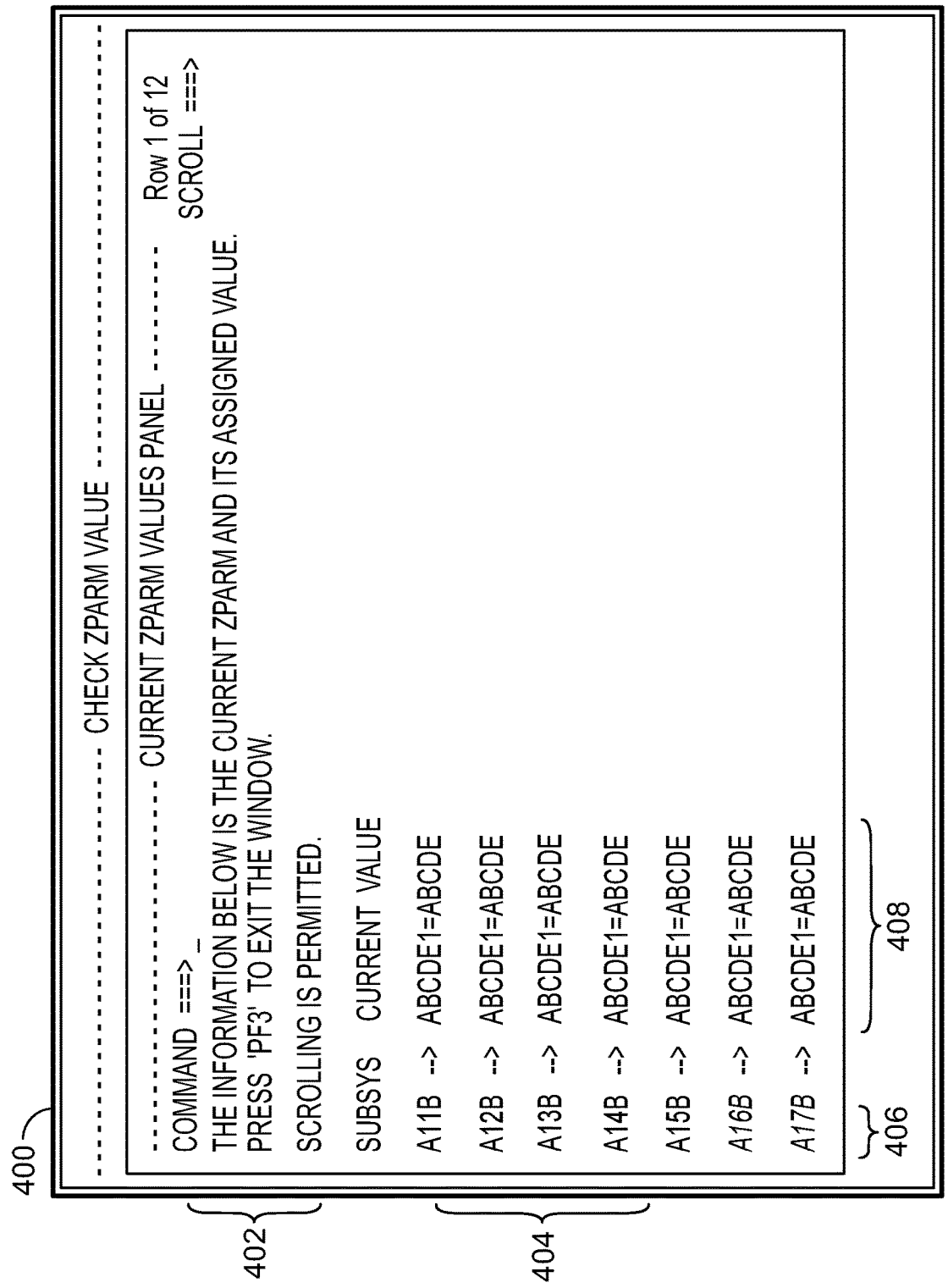
FIG. 4 shows a presentation of an illustrative interface in accordance with principles of the invention.

FIG. 4 shows user illustrative parameter check user interface (UI) 400. UI 400 may be presented to a user upon submission by the user of selection(s) of subsystem parameter value(s) for checking, such as via UI 300 (shown in FIG. 3). UI 400 may be presented as a pop-up window upon submission of the selection(s).

UI 400 may include instructions 402 for reading the current parameter value(s). UI 400 may include table 404. Table 404 may include column 406. Column 406 may indicate subsystem(s) selected by the user for checking of the current parameter value(s). Table 404 may include column 408. Column 408 may indicate the current parameter value(s) of respective subsystem(s).

In some embodiments, table 404 may include one or more features facilitating updating of the indicated subsystem parameters. The parameter-updating features may include one or more widgets.

Figure 5:
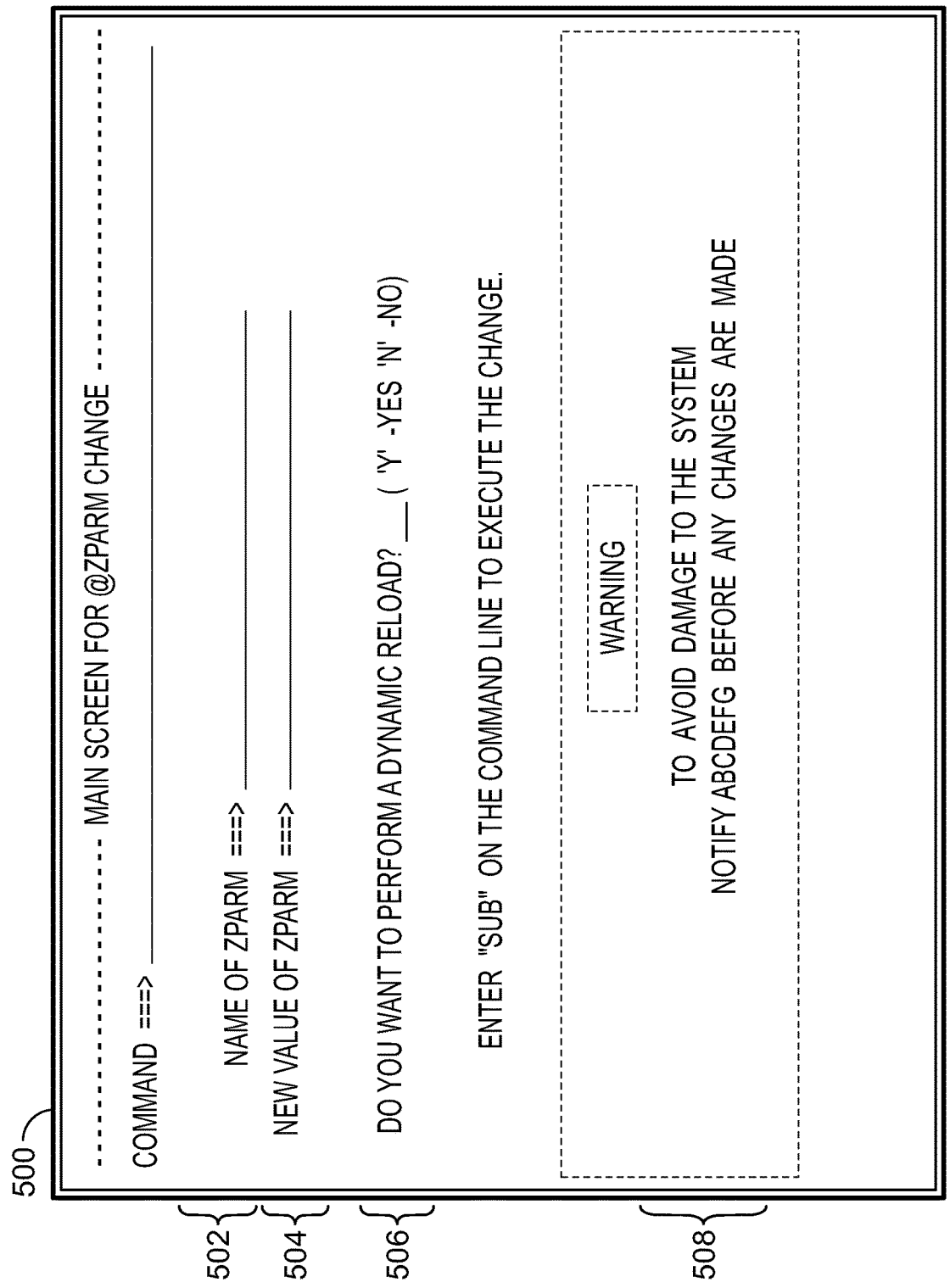
FIG. 5 shows a presentation of an illustrative interface in accordance with principles of the invention.

FIG. 5 shows user illustrative parameter input user interface (UI) 500. UI 500 may be presented to a user upon selection of target subsystems parameter(s) for updating, such as via features 206, 208 and 210 (shown in FIG. 2) and/or via parameter-updating features included in table 404 (shown in FIG. 4).

UI 500 may prompt the user to input data related to updating and/or changing the parameter(s). UI 500 may prompt the user to input data needed to perform the updating. UI 500 may facilitate dynamic reloading of subsystem(s) including the updated parameter(s).

UI 500 may require that at least some information requested by UI 500 be submitted prior to updating of parameters. UI 500 may require that all information requested by UI 500 be submitted prior to updating of parameters.

The updating may be mediated by UI 500. The updating may be performed by UI 500. UI 500 may facilitate execution by the user of the updating.

UI 500 may include parameter name submission feature 502. Parameter name submission feature 502 may facilitate submission by an end user of one or more than one reference to one or more than one parameter for updating. UI 500 may include assignment feature 504. Assignment feature 504 may facilitate submission of one or more than one new parameter value to which the parameter may be updated. UI 500 may include dynamic reloading feature 506. Dynamic reloading feature 506 may facilitate the dynamic reloading of the subsystem(s) including the updated parameter(s). UI 500 may include instructions panel 508. Instructions panel 508 may include information and/or alerts regarding the updating. In some embodiments, the information and/or alerts may be dynamically adjusted based on user input (not shown). In some embodiments, feature(s) of UI 500 may include and/or involve one or more widget(s) facilitating the updating.

Thus, systems and methods for updating parameters in relational database management software of a mainframe computing system have been provided. Persons skilled in the art will appreciate that the present invention can be practiced by other than the described embodiments, which are presented for purposes of illustration rather than of limitation. The present invention is limited only by the claims that follow.

What is claimed is:

1. A system architecture for updating a plurality of subsystem parameters, the plurality of subsystem parameters associated with a plurality of subsystems, the plurality of subsystems included in a relational database management system, the system architecture comprising:

a display configured to display a plurality of features via a first graphical user interface (GUI), said plurality of features prompting at least one selection of at least one subsystem of the plurality of subsystems, the selection mediated by a search function using pattern matching wherein a pattern includes one or more than one of a sequence, token, tree and string, the selection facilitating updating of at least one of the subsystem parameters associated with the selected subsystem, the updating being enabled via machine learning including pattern recognition of the pattern;

a receiver module configured to receive the selection;

a processor module in electronic communication with the display and the receiver module; and computer-readable program code that, when executed by the processor module, instructs the processor module to:

cause the display to present a second GUI in response to the selection received at the receiver module, the second GUI prompting input of the at least one subsystem parameter to be updated, the receiver module being further configured to receive the at least one subsystem parameter;

perform one or more exception handling functions to ensure syntactic compliance of the subsystem parameter to be updated;

determine whether the selection includes more than one subsystem;

using exception handling functions, determine if the selection is one or more of sequential, individual, offset and individually offset;

store the selection in an array for later processing;

determine properties of at least one parameter variable, the properties including:

a location of the variable in terms of:

a column; and a row; and a relation to a macro;

perform an assignment of at least one new value to the at least one subsystem parameter, the assignment including padding and adding program-specific syntactically-required punctuation; and upon successful updating of the at least one parameter, insert a change log record including at least one indication of the updating.

2. The system architecture of claim 1 wherein, when the at least one selection includes a plurality of selections, the computer readable program code, when executed by the processor module, iterates until each of the plurality of selections has been processed.

3. The system architecture of claim 1 wherein the change log record includes an indicator of a user initiating the updating.

4. The system architecture of claim 3 wherein the change log record further includes an indicator of:

a location of the user at the time of the updating;

a property of the updating including a date and a time; and a device identifier corresponding to a device from which the updating occurred.

5. The system architecture of claim 1 wherein the at least one selection is mediated via a wildcard search using a wildcard character.

6. The system architecture of claim 1 wherein the updating involves a user inputting at least one static value and at least one variable.

7. The system architecture of claim 1 wherein the computer readable program code, when executed by the processor module, further instructs the processor module to:
generate a report including data associated with the updating; and
transmit the report to an entity responsible for managing the database.

8. A method for updating subsystem parameters of a relational database management system on a mainframe computer, the method comprising:
presenting, via a first graphical user interface (GUI), features prompting one or more than one selection of at least one subsystem in which to update at least one of the parameters, the selection mediated by a search function using pattern matching wherein a pattern includes one or more than one of a sequence, token, tree and string, the updating being enabled via machine learning including pattern recognition of the pattern;
in response to the selections, presenting, via a second GUI, features prompting input of one or more parameters related to the update;
executing one or more exception handling functions to ensure syntactic compliance of the parameters;
determining whether the one or more than one selection includes more than one subsystem;
executing one or more exception handling functions to determine if the one or more than one selection is one or more of sequential, individual, offset and individually offset;
storing the one or more than one selection in an array for later processing;
determining properties of at least one parameter variable, the properties including:
a location of the variable in terms of:
a column; and
a row; and
a relation to a macro;
assigning to the at least one parameter at least one new value, the assigning including:
padding missing digits; and
adding program-specific syntactically-required punctuation; and
upon successful updating of the parameters, inserting a change log record.

9. The method of claim 8 further comprising presenting a selection feature facilitating searching for the variable to determine if the updating is necessary.

10. The method of claim 8 wherein implementation of the assigning is dependent upon a verification of an identity of a user performing the updating.

11. The method of claim 10 wherein the verification includes authenticating biometric data provided by the user.

12. The method of claim 8 further comprising presenting a selection feature to dynamically reload a subsystem associated with the updating, without requiring a user manually logging on to a logical partition associated with the subsystem.

13. The method of claim 8 wherein, when the one or more than one selection includes a plurality of selections, the steps of the method are repeated for each of the plurality of selections until each of the plurality has been processed.

14. The method of claim 8 wherein the change log record includes an indicator of a user initiating the updating.

15. The method of claim 8 wherein the locating is mediated by a wildcard search function.

16. The method of claim 15 wherein the wildcard search function includes a high-low card search algorithm including:
a highcard search including a first set of search parameters; and
a lowcard search including a second set of search parameters wider than the first set.

17. The method of claim 8 wherein the updating of the parameters includes a user inputting at least one static value and at least one variable.

18. The method of claim 8 further comprising:
generating a report including data associated with the updating; and
transmitting the report to an entity responsible for managing the database.

19. A database management system for updating subsystem parameters associated with subsystems stored on a mainframe computer, the system comprising:
a processor;
computer readable program code that, when executed by the processor, causes a display to present, via a first user interface (UI), features prompting selection of at least one of the subsystems, the selection mediated by a search function using a wildcard character, the selection facilitating updating of at least one of the parameters associated with the at least one of the selected subsystems selected; and
a receiver module configured to receive the selection, wherein the computer readable program code, when executed by the processor, further causes the processor to:
identify whether there are errors associated with at least one subsystem of the plurality of subsystems, and when an error is identified, perform a remediation comprising a temporary fix of the error; and
instruct display of a second UI in response to receiving the selection at the receiver module, the second UI prompting input of the at least one of the parameters to be updated, the receiver module being further configured to receive the input of the at least one of the parameters;
implement a first series of one or more exception handling functions, to ensure syntactic compliance of the at least one of the parameters;
determine whether the selection includes more than one subsystem;
using a second series of exception handling functions, determine whether the selection is one or more of sequential, individual, offset and individually offset;
store the selection in an array for later processing;
determine properties of at least one parameter variable, the properties including:
a location of the variable in terms of:
a column; and
a row; and
a relation to a macro;
implement an assignment of at least one new value to the at least one of the parameters, the assignment including padding and adding program-specific syntactically-required punctuation; and
upon successful updating of the parameters, insert a change log record including indications of the updating.

20. The system of claim 19 wherein, when the selection includes a plurality of subsystems, the computer readable program code, when executed by the processor, iterates steps of the updating until each of the plurality has been updated.

21. The system of claim 19 wherein the change log record includes an indicator of a user initiating the updating.

\* \* \* \* \*